United States Patent [19]

Sawamura et al.

[11] Patent Number: 4,823,157

[45] Date of Patent: Apr. 18, 1989

[54] CAMERA WITH AUTOMATIC FOCUSING APPARATUS

[75] Inventors: Masataka Sawamura; Yasushi Hoshino, both of Hachioji, Japan

[73] Assignee: Konica Corporation, Tokyo, Japan

[21] Appl. No.: 162,425

[22] Filed: Mar. 1, 1988

[30] Foreign Application Priority Data

Mar. 2, 1987 [JP] Japan .................................. 62-48556

[51] Int. Cl.$^4$ ................................................ G03B 3/00
[52] U.S. Cl. .................................... 354/403; 354/402; 354/195.1
[58] Field of Search ............ 354/400, 402, 403, 195.1, 354/195.12, 412, 234.1

[56] References Cited

U.S. PATENT DOCUMENTS 4,623,233 11/1986 Yamada et al. ................... 354/234.1
4,724,455 2/1988 Suzuki et al. ........................ 354/412
4,733,261 3/1988 Gunshi et al. ........................ 354/400
4,748,466 5/1988 Yamada et al. ................ 354/195.12

Primary Examiner—Russell E. Adams
Attorney, Agent, or Firm—Frishauf, Holtz, Goodman & Woodward

[57] ABSTRACT

An automatic focusing apparatus for a camera wherein a distance measurement signal is stored as a digital value, pulses corresponding to a distance, which are generated upon rotational movement of a lens along an optical axis through a motor, are counted, and a stop pawl for stopping the lens is driven in accordance with the count value. A pulse width of the pulses of the pulse signal is detected, the pulses of the pulse signal are counted, and when the number of the counted pulses corresponds to the stored digital value, the stop pawl is driven after a delay time which is determined based on the detected pulse width of a pulse of the pulse signal.

13 Claims, 5 Drawing Sheets

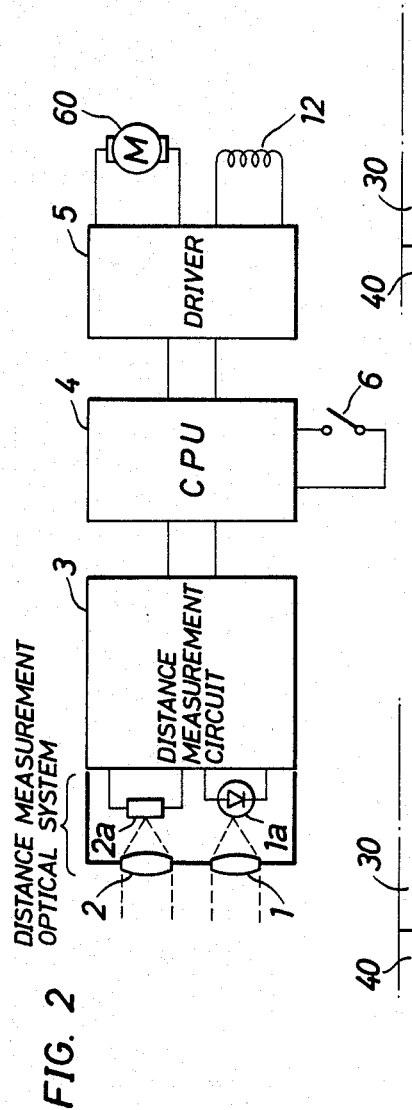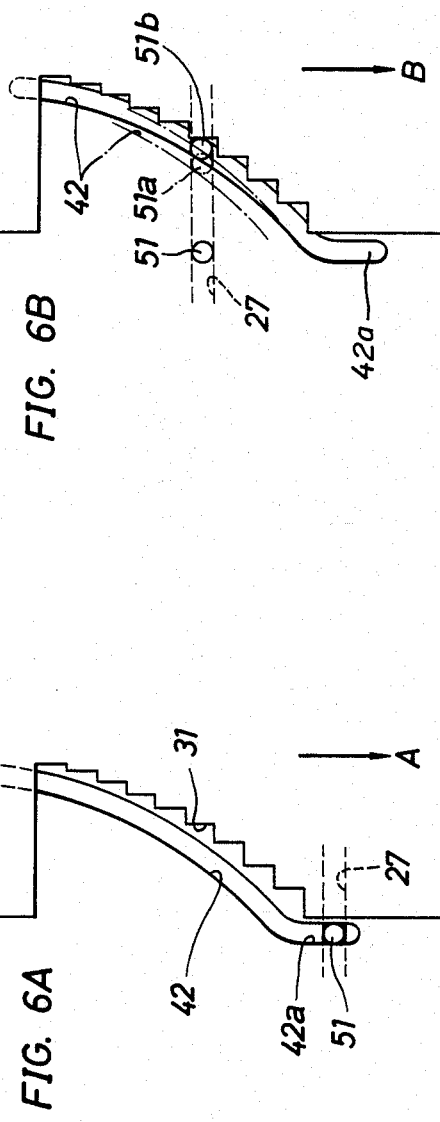

(ACTUATION STATE)

FIG. 3A(a) SECOND MOVABLE COIL MEMBER

FIG. 3A(b) MOTOR 60

FIG. 3A(c) PULSE SIGNAL (22)

FIG. 3A(d) PULSE WIDTH MEASUREMENT (RETURN STATE)

FIG. 3B(a) SECOND MOVABLE COIL MEMBER

FIG. 3B(b) MOTOR 60

FIG. 3B(c) PULSE SIGNAL (22)

FIG. 3B(d) PULSE WIDTH MEASUREMENT

CAMERA WITH AUTOMATIC FOCUSING APPARATUS

BACKGROUND OF THE INVENTION

1. FIELD OF THE INVENTION

The present invention relates to a camera with an automatic focusing apparatus, which is designed to drive a photographing lens to an in-focus position by power of a motor.

2. DESCRIPTION OF THE PRIOR ART

An automatic focusing apparatus for a camera which performs a focusing operation by utilizing motor power comprises a distance measurement device for measuring an object position, and a lens drive member for moving, along the optical axis, a photographing lens and a so-called lens positioning member for regulating the photographing lens at a position along the optical axis. The lens positioning member is rotated by motor power based on distance data obtained by the distance measurement device so as to set a regulating position of the photographing lens. Then, the lens drive member is rotated so that the photographing lens is moved to the regulating position, thereby determining an in-focus position.

The lens positioning member is a cylindrical member having continuous stepped teeth which have steps in the direction of the optical axis. The rotational angle of the lens positioning member is controlled by the distance data from the distance measurement device, so that a predetermined stepped tooth is set at a regulating position of the photographing lens. In this case, control of the rotational angle is performed by feeding back a pulse signal count as follows.

More specifically, the automatic focusing apparatus includes a signal generator capable of generating pulse signals corresponding in number to a digital value of a photographing distance stored based on the distance measurement result, in addition to the distance measurement device. When the lens positioning member begins to rotate by the motor, the signal generator generates a pulse signal corresponding to a pitch of the stepped teeth of the lens positioning member. When the pulse signal count coincides with the above-mentioned digital value, the lens positioning member is mechanically locked to stop its rotation. Thus, the regulating position of the photographing lens corresponding to the measured distance can be obtained in accordance with the rotational angle of the lens positioning member.

The mechanical locking operation of the lens positioning member is performed as follows. That is, when the pulse signal count coincides with the digital value, an electromagnetic device is energized, so that a ratchet type stop pawl is actuated to be engaged with a gear of the lens positioning member. In this operation, a slight mechanical delay is inevitably generated from when the pulse signal count is detected until the ratchet gear is engaged. Therefore, a timing at which the predetermined pulse count is obtained is advanced by a time corresponding to the mechanical delay from a phase of a stepped tooth to be locked, so that a predetermined regulating position can be reliably obtained.

Therefore, a rotational phase difference of the lens positioning member from a timing at which the predetermined pulse count is obtained until the stepped tooth to be locked reaches an engaging position is uniformly set for the stepped teeth. However, the rotational speed of a compact DC motor tends to be gradually increased after a slight time interval after energization. For this reason, after a large number of pulse signals are counted, the engaging timing of the stop pawl is relatively delayed. Thus, an accurate regulating position of the photographing lens corresponding to the distance measurement signal cannot be obtained.

SUMMARY OF THE INVENTION

It is an object of the present invention to provide a camera with an automatic focusing apparatus which can appropriately lock a stepped tooth corresponding to a distance measurement signal without being influenced by a change in rotational speed of a motor, so that a photographing lens can be accurately set at an in-focus position.

In order to achieve the above object, there is provided a camera with an automatic focusing apparatus wherein a distance measurement signal is stored as a digital value in storage means, pulses corresponding to a distance, which are generated upon rotational movement of a lens along an optical axis through a motor, are counted by count means, and a stop pawl for stopping the lens is driven in accordance with the count value, characterized in that a pulse width corresponding to a value corresponding to a value before the digital value stored in the storage means by a predetermined number of steps is detected by detecting means, and when a pulse count corresponding to the stored digital value is detected by the count means, the stop pawl is driven to be delayed in correspondence with the detected pulse width.

BRIEF DESCRIPTION OF THE ACCOMPANYING DRAWINGS

FIG. 2 is a block diagram showing a control circuit for the camera according to the present invention;

FIGS. 3A-3B are timing charts of signals during an automatic focusing operation of the camera according to the present invention, in which FIG. 3A represents a state before a photographing operation, and FIG. 3B represents a state after the photographing operation;

Figs. 6A and 6B are diagrams for explaining the automatic focusing operation of the camera according to the present invention, in which FIG. 6A shows an initial position, and FIG. 6B shows an in-focus position.

DETAILED DESCRIPTION OF THE PREFERRED EMBODIMENT

An embodiment of an automatic focusing apparatus provided to a camera according to the present invention will be described with reference to the accompanying drawings.

Figure 1:
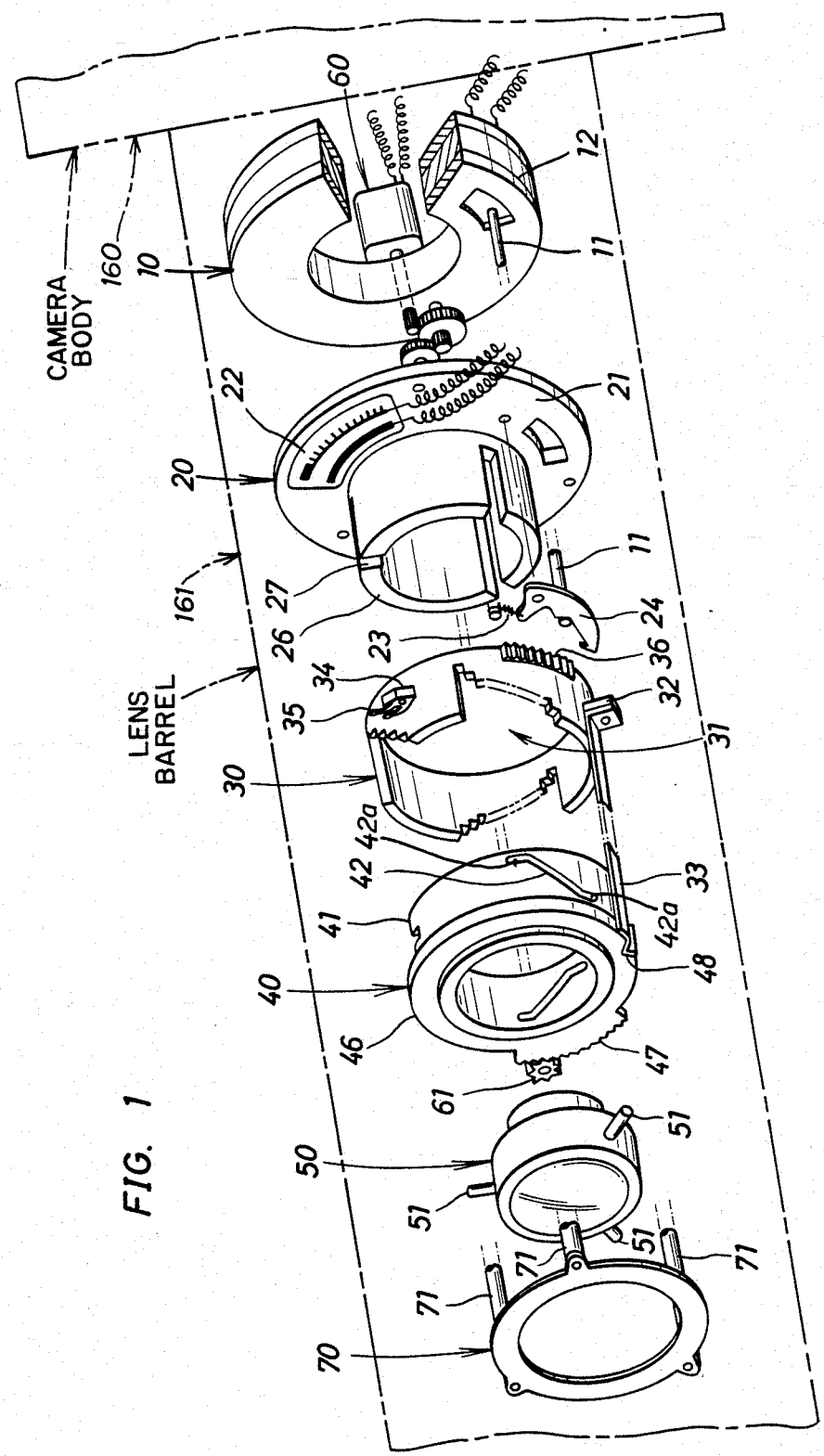
FIG. 1 is an exploded perspective view showing a principal part of an automatic focusing apparatus for a camera according to the present invention.

FIG. 1 is an exploded view of members constituting an apparatus of the present invention for a camera, the illustrated members being arranged along an optical axis. These members are incorporated in a lens barrel portion of the camera as a unit, and are driven and controlled by a power supply and a controller arranged in a camera main body. In FIG. 1, a camera body is shown schematically by reference numeral 160, and the lens barrel portion is shown schematically by the reference numeral 161.

Reference numeral 10 denotes an electromagnetic unit fixed inside the lens barrel 161 which is mounted on camera body 160. The electromagnetic unit 10 houses a first movable coil member (not shown) for controlling an exposure amount of a photographing lens, and a second movable coil member 12 on which a regulating pin 11 for regulating a lock member (to be described later) projects to be pivotal about an optical axis.

Reference numeral 20 denotes a lens guide mounted on the front surface of the electromagnetic unit 10. The lens guide 20 comprises a flange portion 21 and a cylindrical portion 26. A printed circuit board 22 having a detection pattern for sending lens position data to the controller is provided on the flange portion 21. In addition, a stop pawl 24 which is biased clockwise by a tensile spring 23 is axially supported on the flange portion 21. Note that clockwise rotation of the stop pawl 24 is interfered with by the lock effect of the regulating pin 11 of the electromagnetic unit 10.

Three straight grooves 27 are formed in the peripheral surface of the cylindrical portion 26 at equal angular intervals to extend along the optical axis. The grooves 27 respectively receive guide pins 51 of a photographing lens 50 as a first driven member which is slidably engaged with the inner peripheral surface, so that the photographing lens 50 can reciprocate along the optical axis.

Reference numeral 40 denotes a lens drive member as a second driven member which is pivotally engaged with the outer periphery of the cylindrical member 26 of the lens guide 20. The lens drive member 40 has a cylindrical member 41. Three cam grooves 42 formed in the cylindrical portion 41 are respectively engaged with the guide pins 51 of the photographing lens 50 to define a state for regulating a straight moving position of the photographing lens 50 together with the straight grooves 27. The lens drive member 40 can be pivoted or rotated clockwise from an illustrated position in FIG. 1 by a pinion 61 of a DC motor 60 through a gear 47 on a flange 46, and can be pivoted or rotated counterclockwise to return to the illustrated position.

Reference numeral 30 denotes a lens positioning member as a third driven member fitted on the cylindrical portion 41 of the lens drive member 40. Three stepped cams 31 are formed on the end face of the lens positioning member 30 in correspondence with the guide pins 51. The stepped cams 31 are in contact with the guide pins 51 of the photographing lens 50, so as to set the photographing lens 50 at a predetermined focusing position. The lens positioning member 30 and the lens drive member 40 are integrated such that the distal end of a compression spring 33 mounted on a projection 32 of the lens positioning member 30 is engaged with a V-shaped notch 48 formed on the flange portion 46 of the lens drive member 40. The members 30 and 40 are simultaneously rotated by the motor 60.

In this state, the cam grooves 42 of the lens drive member 40 are arranged to be substantially parallel to the corresponding stepped cams 31 of the lens positioning member 30, and to be slightly separated therefrom so as not to cause the guide pins 51 of the photographing lens 50 regulated by the grooved cams 42 to be in contact with the corresponding stepped cams 31.

A contact 35 is mounted o another projection 34 of the lens positioning member 30, and is in sliding contact with an ON/OFF circuit pattern on the printed circuit board 22 of the lens guide 20. Upon rotation of the lens drive member 40, contact 35 cooperates with the ON/OFF pattern on circuit board 22 to produce a pulse signal which is supplied to a controller (FIG. 2). A pawl gear 36 to be engaged with the stop pawl 24 actuated in response to a signal from the controller is also formed on the lens positioning member 30.

The lens drive member 40 and the lens positioning member 30 are pivotally clamped between the front surface of the flange portion 21 of the lens guide 20 and a back surface of a press plate 70 mounted on the flange portion 21 through three columnar members 71 (not shown in detail).

FIG. 2 is a block diagram of a controller for a camera according to the present invention. Reference numeral 1 denotes a projection lens for projecting infrared light emitted from an infrared light emitting diode 1a toward an object; 2, a light receiving lens for receiving the infrared light reflected by the object; 2a, a position detection element for converting the infrared light passing through the light receiving lens 2 and converting it into a current; 3, a distance measurement circuit for sending a light emission signal to the infrared light emitting diode 1a and amplifying a distance signal output from the position detection element 2a; 4, a control circuit for calculating a distance to the object based on the amplified distance signal, storing the calculated result as a digital value, and supplying a drive signal to a driver 5 based on the digital value; and 6, a switch simply representing a pulse signal generation means constituted by the contact 35 provided on the lens positioning member 30 and the printed circuit board 22 provided on the lens guide 20.

Note that reference numeral 12 denotes the second movable coil member of the electromagnetic unit 10; and 60, the lens drive motor, which have already been explained with reference to FIG. 1.

Figure 3A:
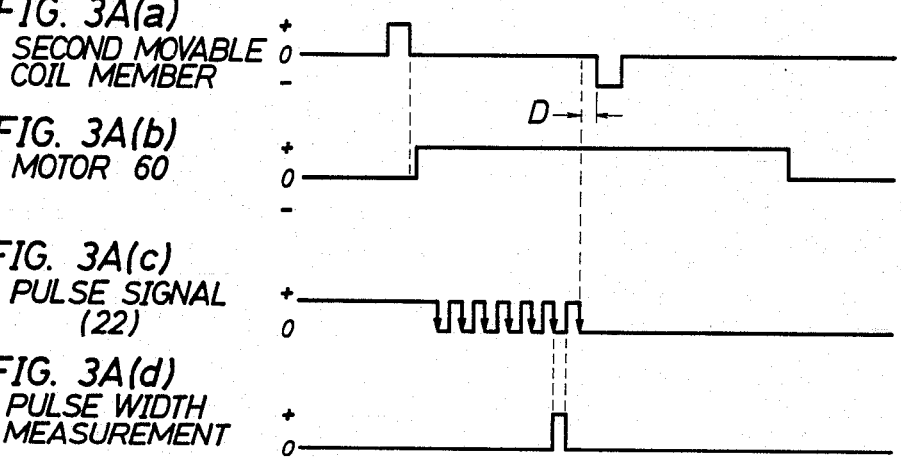
Figure 3B:
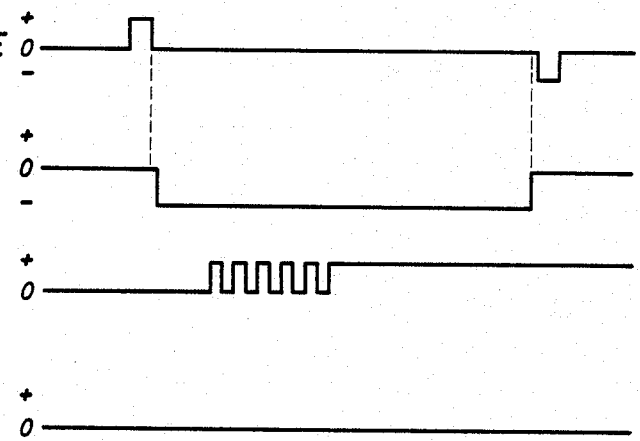

Lens drive control by the controller will be described with reference to the timing charts shown in FIGS. 3A and 3B. FIG. 3A shows a photographing lens drive mode before a photographing operation, and FIG. 3B shows a mode when the photographing lens is returned after the photographing operation is completed.

In synchronism with the shutter release operation of the camera, the distance measurement circuit 3 detects an object distance, and inputs distance data to the control circuit 4. At the same time, as shown in FIG. 3A(a), the second movable coil member 12 is energized for the purpose of safety to apply a counterclockwise rotation torque to the regulating pin 11. When the stop pawl 24 is undesirably engaged with the pawl gear 36 of the lens positioning member 30, the coil member 12 serves to disengage them.

The motor 60 is started slightly after actuation of the regulating pin 11, as shown in FIG. 3A(b), so as to simultaneously rotate the lens drive member 40 and the lens positioning member 30 clockwise.

Upon this rotation, the photographing lens 50 is linearly moved backward, and sliding electrical contact between the contact 35 and the ON/OFF circuit pattern on the printed circuit board 22 causes the supply of a pulse signal (FIG. 3A(c)) along with the movement of the photographing lens 50 to the control circuit 4. The pulse signal is compared with the digital value (CN) of the distance data which has been already stored by the control circuit 4.

During comparison, when the pulse signal count before a predetermined number of steps corresponding to the distance data, i.e., one step from the pulse signal count corresponding to the digital value is obtained, the count means is operated to count the number of clock pulses during the period of a pulse width of the pulse signal to measure the pulse signal width at the resolution of the clock pulses, and supplies the count to the control circuit 4.

The control circuit 4 calculates the rotational speed of the lens positioning member 30 based on the input pulse signal width, and determines an operation timing of the stop pawl 24.

More specifically, the stop pawl 24 is operated by power of the second movable coil member which is rotated in a reverse direction after a predetermined delay time from generation of the pulse signal corresponding to the distance data. In this case, the control circuit 4 controls to increase/decrease a delay time D (FIG. 3A(a)) from when the pulse signal corresponding to the distance data (digital value) is output until the second movable coil member 12 is energized, in accordance with the rotational speed of the lens positioning member 30. With this operation, the stop pawl 24 is accurately engaged with the pawl gear 36 to be locked, and the stepped cams 31 corresponding to the distance data can be accurately set at the regulating position of the photographing lens 50. In a conventional apparatus, the stop pawl 24 is operated in response to the pulse signal corresponding to the distance data regardless of the rotational speed of the lens positioning member 30 under the same conditions. For this reason, in the prior art systems, when the rotational speed of the lens positioning member 30 is higher than a preset condition or speed, the stop pawl (corresponding to pawl 24) is locked with the pawl gear (corresponding to gear 36) at a position which is located after the desired in-focus position. Moreover, in the prior art systems, when the rotational speed of the lens positioning member 30 is lower than the preset condition or speed, the stop pawl is locked with the pawl gear at a position which is located before the desired in-focus position. Thus, in the prior art, the lens is locked at a position which is not at the desired, precise, in-focus position. The present invention can eliminate this drawback.

The delay time D of the actuation of the stop pawl 24 is given by the following equation:

$$D = 0.72 T_p + 0.51 \text{ (msec)}$$

where $T_p$ represents a detected pulse signal width.

Figure 4:
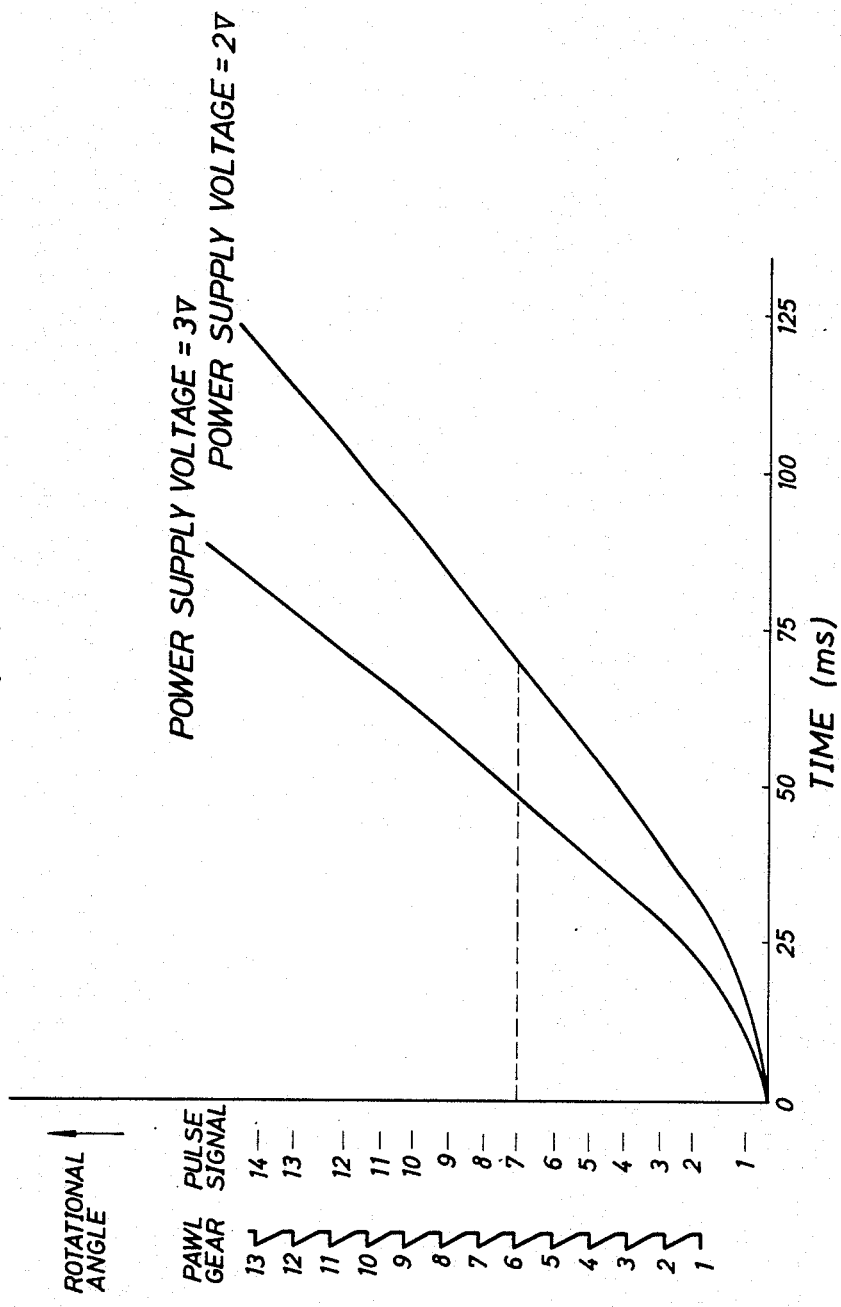
FIG. 4 is a graph showing a rotational speed of a lens positioning member.

FIG. 4 shows rotational speed characteristics of the lens positioning member 30 which are changed upon variations in power supply voltage of the motor 60. For example, assuming that the pulse signal count corresponding to the distance data is "6", a speed when the 6th tooth of the pawl gear 36 to be locked has reached the locking position upon even a decrease in voltage from 3V to 2V is considerably lower than that in an initial rotation state, i.e., when the 2nd or 3rd teeth of the pawl gear 36 is to be locked. Thus, a delay time from when the pulse signal count is obtained until the second movable coil member 12 is actuated must be controlled to advance an operation timing of the stop pawl 24.

In this case, the pulse signal width $T_p$ and the delay time D are as follows:

| Voltage | Tp (msec) | D (msec) |
| --- | --- | --- |
| 3 V | about 2.3 | 2.2 |
| 2 V | about 3.6 | 3.1 |

Figure 5:
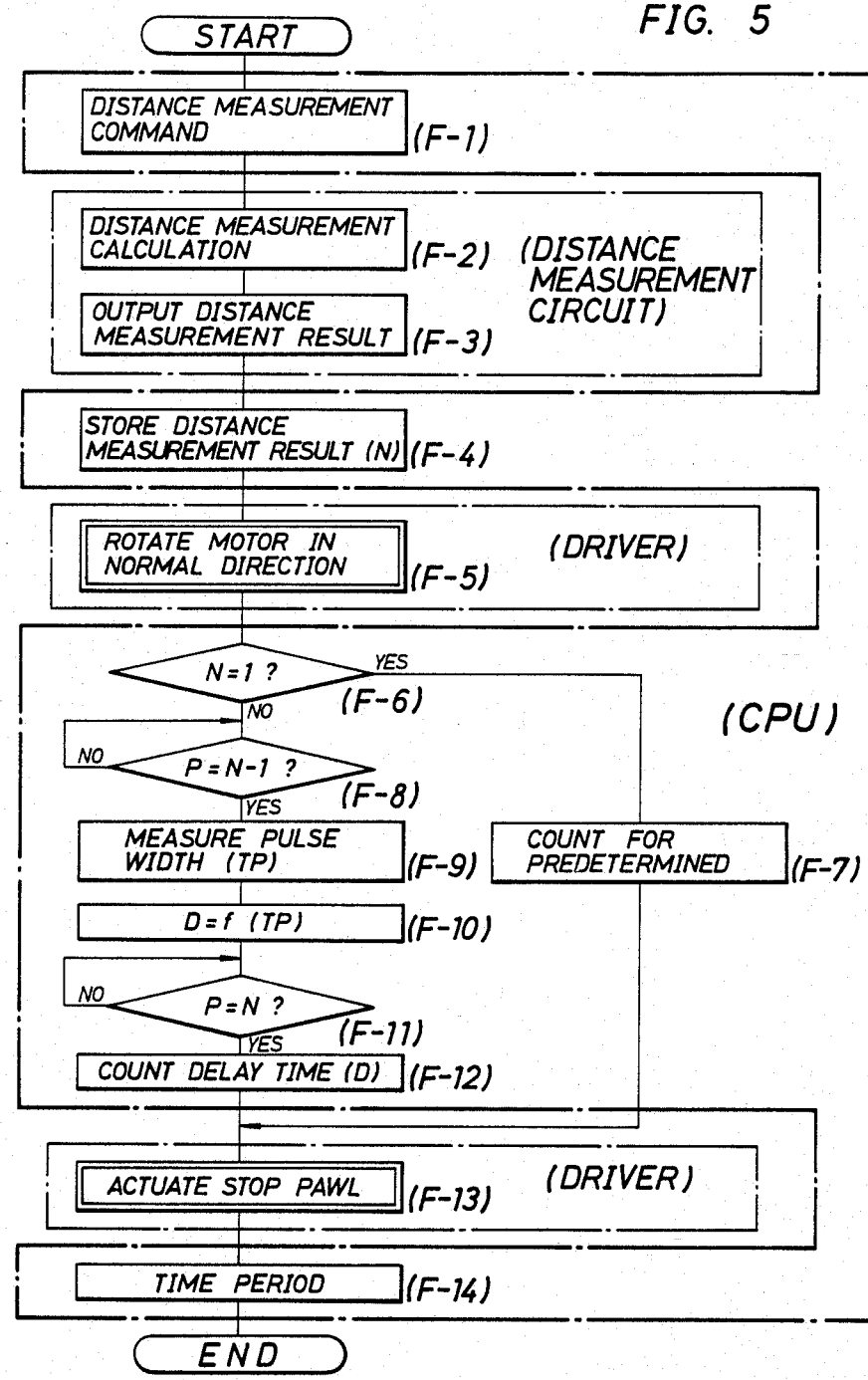
FIG. 5 is a flow chart showing an automatic focusing operation of the camera according to the present invention.

The focusing operation sequence of this embodiment is performed in accordance with the program shown in the flow chart of FIG. 5.

When a distance measurement command is output in response to a release operation (F-1), the control circuit 4 calculates a distance to an object based on a distance signal from the distance measurement circuit (F-2, F-3), and the distance measurement result is stored as a digital value N (F-4). In this case, the motor 60 begins to rotate in a normal direction (F-5). If N 1, i.e., if the stepped cams 31 to be engaged correspond to a 1st step (F-6), it is impossible to measure the pulse width Tp in advance, and the rotational speed of the motor 60 is not yet increased. Therefore, the operation timing of the stop pawl 24 need not be advanced. Thus, the stop pawl 24 is actuated (F-13) after a predetermined delay time has passed (F-7), so as to be engaged with the predetermined pawl gear 36 to lock the lens positioning member 30. In this manner, the predetermined stepped tooth, i.e., the 1st step of each stepped cam 31 is set.

Thereafter, the motor 60 is continuously rotated in the normal direction for a predetermined period of time (F-14), so that the drive member 40 is further rotated clockwise. The compression spring 33 attached to the lens positioning member 30 is disengaged from the notch 48, and the lens drive member 40 is solely kept rotated.

Upon rotation of the lens drive member 40, each guide pin 51 of the photographing lens 50 which is held at a position separate from the corresponding stepped cam 31 abuts against a predetermined step of the corresponding stepped cam 31 so as to set the photographing lens 50 at a position along the optical axis corresponding to the distance data from the distance measurement device. After a predetermined period of time has passed, the motor 60 is stopped to stop the rotation of the lens drive member 40.

If N is larger than 1, when the pulse signal count P corresponding to (N-1) has been reached (F-8), the pulse width Tp is measured (F-9) and the delay time D of the stop pawl 24 is converted to a predetermined function (F-10). When the pulse signal count P corresponding to the distance data has been reached, i.e., when P=N (F-11), the second movable coil member 12 is energized after the delay time D is counted (F-12), thus actuating the stop pawl 24 (F-13).

In this case, the stop pawl 24 is actuated at a faster timing regardless of the predetermined delay time, so that the accelerated lens positioning member 30 can be accurately stopped at a position corresponding to the distance data.

In this manner, the focusing operation of the photographing lens 50 is performed with respect to an object. Subsequently, the first movable coil member is energized to perform an exposure operation, and then, the photographing operation is completed. In response to a signal representing the completion of the photographing operation, the second movable coil member 12 is energized again to move the regulating pin 11 clockwise, thereby disengaging the stop pawl 24 from the pawl gear 26.

The motor 60 is then rotated in the reverse direction so that the lens drive member 40 is rotated counterclockwise to linearly move the photographing lens. Thereafter, when the notch 48 has reached an engaging position with the compression spring 33 of the lens positioning member 30, the lens drive member 40 is rotated counterclockwise together with the lens positioning member 30 to return the member 30 to the initial position. Thereafter, the motor 60 is stopped.

During reverse rotation of the motor 60, even if the lens positioning member 30 is driven by friction or the like before it is integrated with the member 40 upon engagement of the compression spring 33 and the notch 48, since its rotational angle is limited, the members 30 and 40 can be engaged with each other during return movement of the lens drive member 40 to establish the above-mentioned state, and thereafter are stopped.

The grooved cams 42 of the lens drive member 40 used in the focusing apparatus also have the following function.

More specifically, as shown in FIG. 6A, in a state wherein the lens drive member 40 is at the initial position and is engaged integrally with the lens positioning member 30, each grooved cam 42 is substantially parallel to the corresponding stepped cam 31 and is slightly separated therefrom. In addition, a start portion 42a of each cam 42 is linearly bent along a rotational direction A of the lens drive member 40.

Therefore, when the motor 60 just begins to rotate the lens drive member 40 and the lens positioning member 30 in the rotational direction A, it does not receive a load for moving the guide pins 51, i.e., the photographing lens 50 along the optical axis, and a shortage of torque upon starting of the motor 60 can be compensated. Since the start portion 42a is bent in the rotational direction A (i.e., not inclined like the remainder of grooved cam 42), it does not separate each guide pin 51 from the corresponding stepped cam 31 too much, to thereby minimize a moving range of the photographing lens 50. To state it in another way, the motor 60 has a small torque at the beginning of its rotation. However, the grooved cam 42 has a start portion 42a which extends straight in the rotational direction A, and therefore the motor 60 will have less load at the beginning of its rotation when the photographing lens 50 is moved along its optical axis by means of guide pins 51 which are engaged with the grooved cam 42 at said start portion 42a. In this manner, a space inside the lens barrel can be saved.

Note that in FIG. 6B, the position of each grooved cam 42 when the rotation of the lens positioning member 30 is stopped is indicated by alternate long and short dashed curves, and the position of the grooved cam 42 when the lens drive member 40 is slightly rotated in a rotational direction B from the above state is indicated by solid curves. Each guide pin 51 is sequentially moved from a position of a guide pin 51a to a position of a guide pin 51b, and is brought into contact with the predetermined stepped cam 31 to set the photographing lens 50 at an in-focus position.

In this embodiment, a signal width, one pulse signal count before the pulse signal count corresponding to the measured distance data, is measured, and the delay time D until the stop pawl 24 is actuated is calculated and determined based on the measurement result. However, in accordance with rotational characteristics of the lens positioning member 30, the delay time D may be determined in accordance with an average value of one or more measurement values of the advanced pulse signal widths, and the same effect as described above can be provided. This modification is included in the present invention.

According to the present invention, in an automatic focusing apparatus for setting the photographing lens at an in-focus position by motor power, the actuation timing of the stop pawl for locking the stepped cams for regulating the in-focus position is controlled to be synchronized with an increase in rotational speed of the motor, so that the photographing lens is set at the accurate in-focus position. Thus, a camera with an automatic focusing apparatus in which an automatic focusing function can be normally operated to obtain a clear and well focused image can be provided.

Various alterations and modifications can be made within the inventive concept.

We claim:

1. An automatic focusing apparatus for a camera, comprising:
    means for obtaining distance data corresponding to a distance from a camera to an object;
    storage means for storing said distance data as a digital value;
    a photographing lens means which is movable along an optical axis;
    means coupled to said movable lens means for generating a pulse signal in accordance with movement of said lens means along said optical axis, said pulse signal including a plurality of pulses;
    count means for counting the pulses of said pulse signal generated when said lens means is moved along said optical axis, and for producing a count value;
    stop means coupled to said lens means for selectively stopping movement of said lens means at least as a function of the count value from said count means;
    detection means for detecting a pulse width of at least one pulse of said pulse signal; and
    drive control means coupled to said stop means and responsive to said count means having counted a number of said pulses of said pulse signal corresponding to said digital value, for delaying a drive operation of said stop means by a delay time which is a function of the pulse width of said at least one pulse of said pulse signal as detected by said detection means, said at least one pulse being generated before said lens means reaches a position corresponding to said stored distance data by a predetermined distance.

2. The apparatus of claim 1, wherein said means for obtaining distance data comprises a distance measurement optical system including:
    an infrared light emitting diode means for emitting an infrared ray;
    projection lens means for projecting said infrared ray toward an object;
    a light receiving lens means for receiving the infrared ray reflected by the object; and
    position detection means for receiving the reflected infrared ray from said light receiving lens means and for outputting an electrical signal representing a distance from the camera to the object.

3. The apparatus of claim 1, wherein said detection means comprises a counter means coupled to a source of clock pulses for counting the number of clock pulses generated during the period of a pulse width of said at least one pulse of said pulse signal to thereby measure said pulse signal width at the resolution of the clock pulses.

4. The apparatus of claim 1, wherein said drive control means includes means for calculating an actuation timing of said stop means based on the pulse width detected by said detection means.

5. The apparatus of claim 1, wherein said drive control means includes means for varying said delay time in accordance with a power supply voltage of said camera.

6. The apparatus of claim 1, wherein said drive control means includes means for varying said delay time in accordance with the following equation:

$$D = 0.72 Tp + 0.51$$

where D is the delay time, and
Tp is a pulse width detected by said detection means.

7. The apparatus of claim 1, wherein said stop means comprises a movable stop member for selectively engaging said lens means for selectively stopping movement of said lens means; and drive means coupled to said movable stop member for driving said movable stop member to a stop position for selectively stopping said movable lens means, said drive means being operatively coupled to said drive control means and being operated by said drive control means.

8. A method for automatic focusing of a camera, comprising:
obtaining distance data corresponding to a distance from a camera to an object;
storing said distance data as a digital value;
moving a photographing lens means along an optical axis;
generating a pulse signal in accordance with movement of said lens means along said optical axis, said pulse signal including a plurality of pulses;
counting the pulses of said pulse signal which are generated when said lens means is moved along said optical axis, and producing a count value;
said movable lens for selectively stopping movement of said lens means at least as a function of said count value;
detecting a pulse width of at least one pulse of said pulse signal; and
delaying the stopping of said lens means, responsive to the count value of said counted pulses of said pulse signal corresponding to said digital value, by a delay time which is a function of the detected pulse width of said at least one pulse of said pulse signal, said at least one pulse being generated before said lens means reaches a position corresponding to said stored distance data by a predetermined distance.

9. The method of claim 8, wherein said step of obtaining distance data comprises:
emitting an infrared ray;
projecting said infrared ray toward an object;
receiving the infrared ray reflected by the object; and
generating an electrical signal, responsive to the received reflected infrared ray, representing a distance from the camera to the object.

10. The method of claim 8, wherein said detecting step comprises counting a number of clock pulses generated during the period of a pulse width of said at least one pulse of said pulse signal, to thereby measure said pulse signal width at the resolution of the clock pulses.

11. The method of claim 8, wherein said delaying step includes calculating a timing of the stopping of said lens means based on said detected pulse width.

12. The method of claim 8, wherein said delaying step includes varying said delay time in accordance with a power supply voltage of said camera.

13. The method of claim 8, wherein said delaying step includes varying said delay time in accordance with the following equation:

$$D = 0.72 Tp + 0.51$$

where D is the delay time, and
Tp is the detected pulse width.

* * * * *